United States Patent [19]

Dimyan

[11] 3,927,398

[45] Dec. 16, 1975

[54] MAGNETIC BUBBLE PROPAGATION CIRCUIT

[75] Inventor: Magid Y. Dimyan, Fords, N.J.

[73] Assignee: Canadian Patents & Development Limited, Ottawa, Canada

[22] Filed: Oct. 21, 1974

[21] Appl. No.: 516,484

[52] U.S. Cl. .......... 340/174 TF
[51] Int. Cl.[2] .......... G11C 11/14
[58] Field of Search .......... 340/174 TF

[56] References Cited

UNITED STATES PATENTS

| | | | |
|---|---|---|---|
| 3,540,019 | 11/1970 | Bobeck et al. | 340/174 TF |
| 3,636,531 | 1/1972 | Copeland | 340/174 TF |

*Primary Examiner*—Vincent P. Canney
*Attorney, Agent, or Firm*—Edward Rymek

[57] ABSTRACT

A magnetic bubble propagation circuit consisting of magnetic material bars positioned over the bubble supporting material to define the bubble propagation path. Each bar is spaced from the bubble material such that a uniform gradient is formed between the bar and the bubble material in the direction of the propagation path. A periodic pulsed or sinusiodal magnetic field of sufficient strength to magnetize the bars is applied in the plane of the material and parallel to the propagation path to cause a bubble to move from one bar to an adjacent bar, and the gradient causes the bubble to move from one end of the bar to the other when the field is removed.

4 Claims, 7 Drawing Figures

MAGNETIC BUBBLE PROPAGATION CIRCUIT

Figure 1:
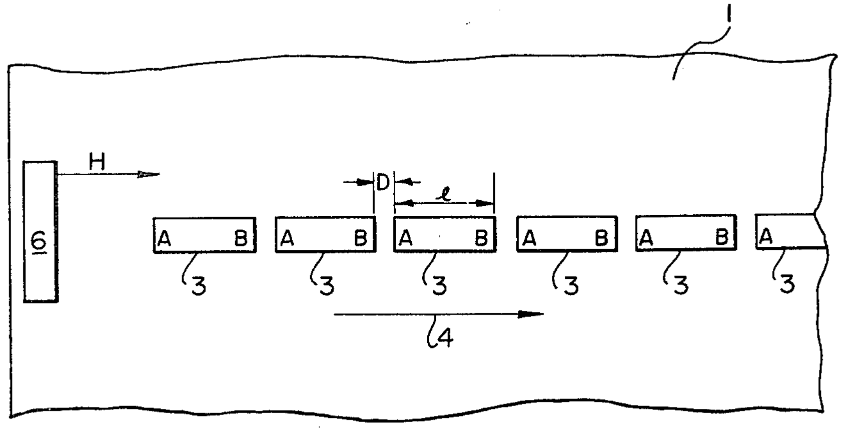

This invention relates to a magnetic bubble domain propagation circuit and in particular to a propagation circuit which employs the effect of gradient in spacing between bubble material and a permalloy film on the translational force of bubble domains.

It has been shown by Thiele et al. in a publication entitled: "The Energy and General Translation Force of Cylindrical Magnetic Domains", — Bell System Technical Journal vol. 50, pp. 711–724, March 1971 that magnetic bubble domains in uniaxial magnetic films or platelets can be moved by introducing gradients in any of the independent parameters which determine the total bubble energy. These parameters are the applied bias field, the uniaxial film or plate thickness, the saturation magnetization and the wall energy density. This has led to the development of various types of permalloy overlay bubble propagation circuits in which transverse fields are applied to induce magnetic poles in the overlay to attract the bubbles. In some such circuits such as the "T-bar" overlay, "Y-bar" overlay, or "chevron" overlay rotating transverse fields are necessary to propagate the bubbles through the bubble material, and in the "parallel bar" overlay as described in U.S. Pat. No. 3,705,394 which issued on Dec. 5, 1972 to Della Torre, assignee to Canadian Patents and Development Limited, a single phase transverse field is used to propagate the bubbles in one direction.

In a publication entitled "The Effect of Gradient in Spacing Between Bubble Material and Permalloy Film on the Translational Force of Bubble Domains" — Proceedings of the IEEE, vol. 61, no. 12, December 1973 pages 1761, 1762, applicant has shown that a translational force acting on magnetic bubble domains can also be produced by means of a gradient in spacing between bubble material and a permalloy thin film and will create a bubble propagation velocity which may be determined by the equations:

$$\frac{2\,V_d}{\mu_\omega\,4\pi M_s} + \frac{8\,H_c}{\pi 4\pi M_s} = -\,C_s\,\frac{\Delta s}{s} \qquad (1)$$

where $V_d$ is bubble propagating velocity, $\mu_\omega$ is the mobility, $M_s$ is the saturation magnetization, $H_c$ is the wall motion coercivity, $C_s$ is the transverse force coefficient, and $s$ is the spacing between the bubble material and the overlay.

and $$C_s = \frac{4s}{a}\left[sF\left(\frac{a}{2s}\right) + (s+1)\,F\left(\frac{a}{2\,(s+1)}\right) - (2s+1)\,F\left(\frac{a}{2s+1}\right)\right] - \frac{12s}{a^2}\left[2\,s^2\,I\left(\frac{a}{2s}\right) + 2\,(1+s)^2\,I\left(\frac{a}{2\,(s+1)}\right) - (1\ 2s)^2\,I\left(\frac{a}{2s+1}\right)\right] \qquad (2)$$

where $$a = \frac{d}{h}$$

is the bubble aspect ratio, $d$ is the diameter of the bubble and $h$ is the material thickness, I is the internal magnetostatic energy function of a free bubble, and F is the generalized force function of a free bubble.

It is therefore an object of this invention to provide a circuit to propagate magnetic bubble domains in a bubble material by means of a gradient in spacing between the bubble material and an overlay.

It is a further object of the invention to provide a circuit to propagate magnetic bubble domains in a bubble material using unidirectional and/or unipolar pulsed or sinusoidal magnetic drive fields.

It is another object of this invention to provide a circuit to propagate magnetic bubble domains in a bubble material having improved operating margins.

It is a further object of this invention to provide a circuit to propagate magnetic bubble domains in a bubble material having enhanced propagation velocities.

These and other objects are achieved in a propagation circuit which consists of an overlay of bars made of magnetic material positioned over a film of magnetic bubble material such that they define a bubble propagation path. The bars, which have a substantially uniform thickness are spaced from the bubble material so as to form a uniform gradient between the bubble material and the ends of each bar in the direction of the propagation path. This gradient may be produced by having a wedge-shaped non-magnetic element between each bar and the bubble material. The circuit further includes a periodic pulsed or sinusoidal magnetic field generator which applies a field in the plane of the bubble material and parallel to the propagation path, which magnetizes the bars causing a bubble to move from one bar to an adjacent bar. When the bars are demagnetized, the bubble will move forward from the end of the bar having the greatest spacing to the other end which has the smallest spacing.

IN THE DRAWINGS

Figure 2:
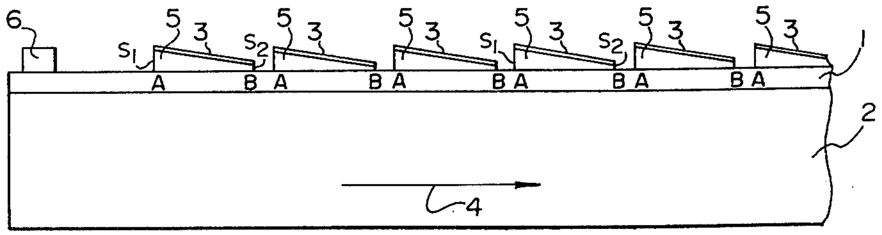
Figure 3:
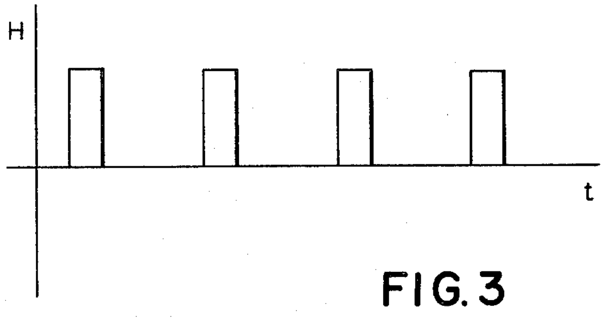
Figure 4A:
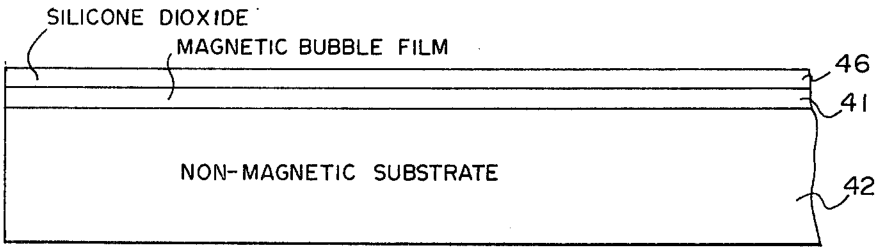
Figure 4B:
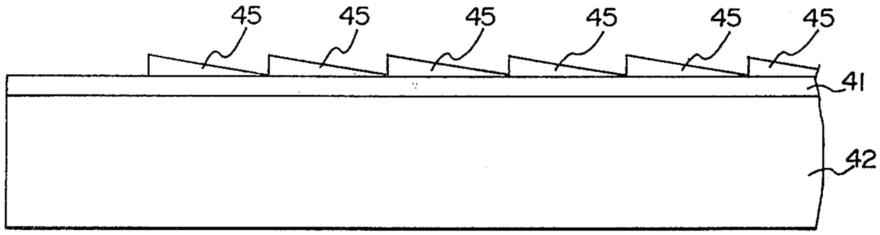
Figure 4C:
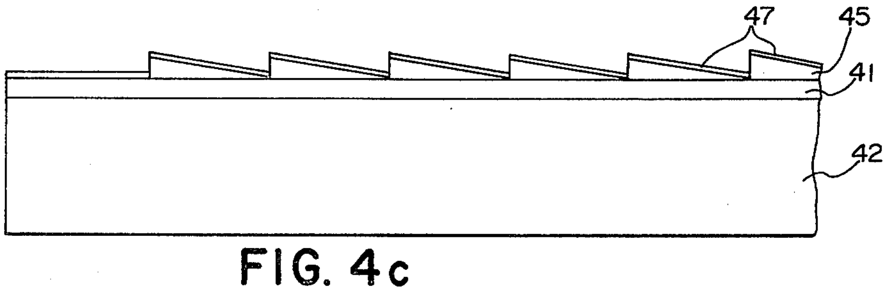
Figure 4D:
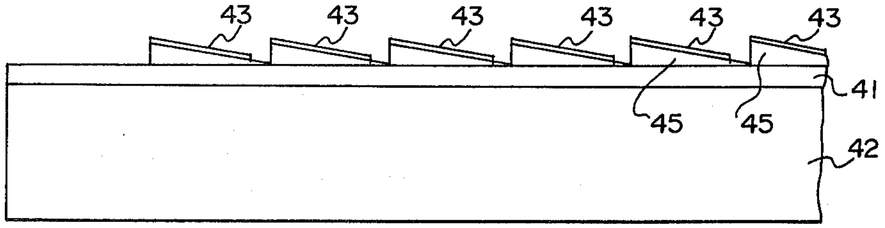

FIG. 1 schematically illustrates a top view of a propagation circuit in accordance with this invention;

FIG. 2 schematically illustrates a side view of the propagation circuit;

FIG. 3 depicts the magnetic field used to drive the propagation circuit; and

FIGS. 4(*a*), 4(*b*), 4(*c*) and 4(*d*) illustrate the various steps in one method of manufacture of a propagation circuit in accordance with this invention.

One embodiment of the invention is schematically shown in FIGS. 1 and 2 in which only one propagation circuit is shown for clarity, though many such circuits may be provided on a substrate to form a memory system. Conventionally, magnetic bubbles are produced in a thin uniaxial magnetic film 1 such as a magnetic garnet epitaxially grown on a non-magnetic substrate 2 such as Gadolinium Gallium Garnet.

One magnetic film is the composition $Y_{1.92}Sm_{0.1}Ca_{0.98}Fe_{4.02}Ge_{0.98}O_{12}$ which has a domain wall mobility of 1500 cm/sec. Oe, a domain wall coercivity of 0.1 and a saturation magnetization of 200 Gauss. Furthermore, this composition is insensitive to temperature variations making it very suitable for bubble device applications that require high data rates over a broad operating temperature range. As an example, both the nominal film thickness and the nominal bubble diameter in the middle of the operating range can be 6$\mu$m giving a bubble aspect ratio of one.

As shown in FIG. 1, the propagation circuit consists of a series of bars 3 made of magnetic material such as Permalloy. The bars are positioned along a predetermined propagation path on the magnetic bubble material. In addition, as shown in FIG. 2, the bars are arranged such that the spacing between the epitaxial film 1 and each bar has a uniform gradient in the direction of bubble propagating.

In the present embodiment, the bars are shown as being rectangular, though trapezoidal or other shaped bars may be used. Each bar 3 in the circuit is preferably the same length *l*, and the spacings A between adjacent bars are preferably identical to obtain a maximum number of storage points in a circuit as well as minimum propagation time for bubble movement through storage locations in the bubble material. As shown in FIG. 2, spacing between the bar 3 and the epitaxial material, has a uniform gradient from a spacing of $S_1$ at one end A down to a spacing of $S_2$ at the other end of the bar 3. The direction of bubble propagation is represented by arrow 4. This gradient may be maintained by a wedge shaped non-magnetic element 5 made of material such as $SiO_2$.

In operation, a magnetic field producing structure 6 provides a unipolar pulsed or sinusoidal propagating field in the direction of the propagation path shown by arrow H. Assuming positively charged magnetic bubbles, a bubble will sit under end B of a bar 3 in the absence of an in-plane drive field. When a sinusoidal field or a pulsed field of the type shown in FIG. 3, is applied in the direction of arrow H, shown in FIG. 1, the bubble will move forward in direction shown by arrow 4 to a position under end A of the adjacent bar 3 which will have a negative charge. However, when the propagating field is reduced to zero, the gradient in the spacing between the bar 3 and the film 1 will create a translational force on the bubble which will push the bubble forward to the B end of the same bar 3. Thus a unidirectional and unipolar field is all that is required to move the bubble domain one propagation cycle. The pulse width or field on-time must be sufficiently long to allow the bubble to move across the distance D between adjacent bars and the field off-time must be sufficiently long to allow the bubble to move from end A to end B of the bar 3.

In a circuit having the dimensions: bar length 15 $\mu$m, bar width 5 $\mu$m, bar thickness ~ 0.4 $\mu$m, D of 3 $\mu$m, $S_1 = 2$ $\mu$m and $S_2 = 0.3$ $\mu$m, and with a pulsed field $H_1 =$ 10 to 20 Oe, the bubble propagation will be greater than 2000 cm/sec which provides a data rate in excess of 1$Mh_z$.

One method by which the propagation circuit in accordance with this invention may be manufactured is shown in FIG. 4.

First, (FIG. 4*a*) a film 45 of uniform thickness of $SiO_2$ or some such material is deposited over the epitaxial bubble film 41 which has been grown on a non-magnetic substrate 42. Any conventional method such as sputtering may be used.

Second, (FIG. 4*b*) portions of the $SiO_2$ film are milled out creating a uniform gradient in the $SiO_2$ thickness in predetermined regions 45. This may be done using a suitably controlled ion-beam unit. Then, (FIG. 4*c*) a thin film 47 of magnetic material, such as permalloy is sputtered on the entire surface, and finally (FIG. 4*d*) by ion milling or chemical etching along with the appropriate mask, a pattern of bars is obtained over the wedge-shaped $SiO_2$ region.

Though the description of the invention has been limited to a bubble propagation circuit which solely employs the translational force acting on bubbles produced by a gradient in spacing between the bubble material and the thin magnetic material overlay, the invention may also be used to improve the circuit margins of conventional bubble propagation circuits which require an overlay for moving bubbles.

I claim:

1. A bubble domain propagating circuit for moving bubbles along a predetermined path in a film of magnetic bubble material comprising:

an overlay of bars of magnetic material positioned over the film of magnetic bubble material, said bars defining the bubble propagation path;

means adapted to space said bars from the bubble material to maintain a uniform gradient between each of said bars and the bubble material in the direction of said propagation path; and means for generating a periodic magnetic field in the plane of said bubble material and parallel to said propagation path, said field being capable of magnetizing said bars.

2. A bubble domain propagating circuit as claimed in claim 1 wherein the periodic magnetic field has the waveform of a unidirectional and/or unipolar pulse.

3. A bubble domain propagating circuit as claimed in claim 1 wherein said gradient maintaining means comprises a wedge-shaped non-magnetic element located between each of said bars and said bubble material.

4. A bubble domain propagation circuit as claimed in claim 3 wherein said bars are rectangular with the length of the bar positioned in the direction of the propagation path.

* * * * *